United States Patent
Rapps et al.

(10) Patent No.: US 9,994,173 B2
(45) Date of Patent: Jun. 12, 2018

(54) INCREASING THE AVAILABILITY OF ULTRASOUND-BASED DRIVER ASSISTANCE SYSTEMS IN THE EVENT OF UNDERVOLTAGE IN THE VEHICLE

(71) Applicant: Robert Bosch GmbH, Stuttgart (DE)

(72) Inventors: Peter Rapps, Karlsruhe (DE); Michael Hering, Leonberg (DE); Albrecht Klotz, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 720 days.

(21) Appl. No.: 14/412,224

(22) PCT Filed: May 17, 2013

(86) PCT No.: PCT/EP2013/060314
§ 371 (c)(1),
(2) Date: Dec. 31, 2014

(87) PCT Pub. No.: WO2014/005756
PCT Pub. Date: Jan. 9, 2014

(65) Prior Publication Data
US 2015/0175100 A1    Jun. 25, 2015

(30) Foreign Application Priority Data
Jul. 4, 2012    (DE) .......... 10 2012 211 630

(51) Int. Cl.
*B60L 1/00* (2006.01)
*B60L 3/00* (2006.01)
(Continued)

(52) U.S. Cl.
CPC .......... *B60R 16/03* (2013.01); *G01S 7/52004* (2013.01); *G01S 7/524* (2013.01); *G01S 15/00* (2013.01); *G01S 15/931* (2013.01)

(58) Field of Classification Search
CPC ....... B60R 16/03; G01S 15/00; G01S 15/931; G01S 7/524; G01S 7/52004
(Continued)

(56) References Cited

U.S. PATENT DOCUMENTS 4,910,512 A    3/1990    Riedel
7,329,354 B2   2/2008    Mullee
(Continued)

FOREIGN PATENT DOCUMENTS

DE            198 29 150       1/2000
DE     10 2006 026 404       12/2007
(Continued)

OTHER PUBLICATIONS

International Search Report for PCT/EP2013/060314, dated Aug. 1, 2013.

*Primary Examiner* — Daniel Kessie
*Assistant Examiner* — Toan Vu
(74) *Attorney, Agent, or Firm* — Norton Rose Fulbright US LLP; Gerard Messina

(57) ABSTRACT

A driver assistance system of a vehicle includes: at least one ultrasonic sensor for ascertaining the distance of the vehicle from an obstacle, the sensor being supplied with electrical energy by an onboard electrical system of the vehicle; and an undervoltage detector for detecting an undervoltage in the onboard electrical system, in the event of which the power requirement of the ultrasonic sensor is reduced.

6 Claims, 3 Drawing Sheets

(51) Int. Cl.
    *H02G 3/00*           (2006.01)
    *B60R 16/03*         (2006.01)
    *G01S 15/93*         (2006.01)
    *G01S 7/52*           (2006.01)
    *G01S 7/524*         (2006.01)
    *G01S 15/00*         (2006.01)

(58) Field of Classification Search
    USPC .......................................................... 307/10.1
    See application file for complete search history.

(56) References Cited

U.S. PATENT DOCUMENTS

| | | |
|---|---|---|
| 7,567,168 B2 * | 7/2009 | Li .................... G01S 15/931 |
| | | 307/10.1 |
| 9,140,791 B2 | 9/2015 | Klotz |
| 2001/0043090 A1 | 11/2001 | Savord |
| 2003/0024883 A1 | 2/2003 | Mullee |
| 2009/0043203 A1 | 2/2009 | Pelissier |
| 2009/0150692 A1 * | 6/2009 | Poland ................ G06F 1/3203 |
| | | 713/320 |
| 2009/0187781 A1 * | 7/2009 | Gronemeier ........... G06F 1/305 |
| | | 713/340 |
| 2010/0141417 A1 | 6/2010 | Boes |
| 2010/0245066 A1 | 9/2010 | Sarioglu et al. |
| 2012/0170411 A1 * | 7/2012 | Suzuki ................ G01S 15/878 |
| | | 367/99 |

FOREIGN PATENT DOCUMENTS

| | | |
|---|---|---|
| EP | 1 921 463 | 5/2008 |
| JP | H1048334 A | 2/1998 |
| JP | 2006 101977 | 4/2006 |

* cited by examiner

INCREASING THE AVAILABILITY OF ULTRASOUND-BASED DRIVER ASSISTANCE SYSTEMS IN THE EVENT OF UNDERVOLTAGE IN THE VEHICLE

BACKGROUND OF THE INVENTION

1. Field of the Invention

The present invention relates to a driver assistance system of a vehicle including at least one ultrasonic sensor for ascertaining the distance of the vehicle from an obstacle, the sensor being supplied with electrical energy by an onboard electrical system of the vehicle. Furthermore, the present invention relates to a method for operating a driver assistance system of a vehicle including at least one ultrasonic sensor for ascertaining the distance of the vehicle from an obstacle, the sensor being supplied with electrical energy by an onboard electrical system of the vehicle.

2. Description of the Related Art

Ultrasonic sensors used in driver assistance systems for ascertaining the distance of the vehicle from an obstacle operate using the pulse-echo principle for distance measurement. An ultrasonic pulse is initially generated by the ultrasonic sensor, and the propagation time of the ultrasonic pulse to an obstacle and of the echo back to the sensor is then ascertained. By evaluating the propagation time, it is possible to calculate the distance from the obstacle. During the generation of an ultrasonic pulse, the ultrasonic sensor has a very high power consumption. On the other hand, during the ultrasound reception phases, the power consumption of the sensor is very low. The ultrasonic sensor is supplied with electrical energy via the onboard electrical system.

In the event of a sudden undervoltage in the onboard electrical system of the vehicle, for example, triggered by an automatic start-stop system, two basic strategies of driver assistance systems and responses of the ultrasonic sensor are known:

In a first variant, there is no response by the sensor to the occurrence of an undervoltage in the onboard electrical system of the vehicle. Subsequently, the high consumption of power and current results in a sharp voltage drop at the sensor. As a result of the remaining supply voltage at the ultrasonic sensor being too low, a reset of the sensor is carried out. As a result, the ultrasonic distance measurement is interrupted. All functions of the driver assistance system which are based on the distance measurement and the ultrasound data receive no further distance information. This results in a severe degradation of the system.

In a second known strategy, in the event of an undervoltage in the onboard electrical system of the vehicle, the ultrasonic sensor completely prevents transmission pulse generation after detection of an undervoltage by the sensor. Consequently, the ultrasonic distance measurement is corrupted due to the ultrasonic pulse which is not generated, since no further signal echoes are detectable and it is no longer possible to calculate the distance of the vehicle from an obstacle. All those functions of the driver assistance system which operate based on the distance measurement and the ultrasound data no longer receive any distance information. Thus, this also results in a severe degradation of the system.

A method for controlling the energy distribution in a motor vehicle is known from published German patent application document DE 198 29 150 A1, a hierarchical control structure being used which distinguishes between higher-level and lower-level components. The load power for a certain lower-level component is provided only if the higher-level components are already being supplied. Furthermore, the lower-level components are deactivated if the higher-level components have a demand for power output. In the event of an undervoltage, it is disadvantageous that the hierarchically lower-level ultrasonic sensor is completely deactivated and is thus not able to provide any further distance information. This approach also results in all functions of the driver assistance system which operate based on the distance measurement and the ultrasound data not receiving any further distance information, resulting in a severe degradation of the system.

The object of the present invention is thus to refine a driver assistance system and a method for operating a driver assistance system of a vehicle including at least one ultrasonic sensor for ascertaining the distance of the vehicle from an obstacle in such a way that the availability of ultrasound-based driver assistance systems is increased in the event of an undervoltage in the onboard electrical system of the vehicle.

BRIEF SUMMARY OF THE INVENTION

According to the present invention, in the driver assistance system of a vehicle including at least one ultrasonic sensor for ascertaining the distance of the vehicle from an obstacle, the sensor being supplied with electrical energy by an onboard electrical system of the vehicle, it is provided that the system includes an undervoltage detector and is equipped in such a way that in the event of an undervoltage in the onboard electrical system, the power requirement of the ultrasonic sensor is reduced.

The core of the present invention is thus the detection of an undervoltage in the onboard electrical system of the vehicle and a reduction of the power requirement of the ultrasonic sensor, whereby an operation of the driver assistance system may generally be maintained without a voltage drop at the ultrasonic sensor which is too high due to the generation of an ultrasonic pulse resulting in an overload of the onboard electrical system with the risk of the failure of other components. The basic availability of the driver assistance system for ascertaining the distance of the vehicle from an obstacle is thus generally maintained.

Furthermore, a control unit for controlling the sensor and for evaluating the propagation time of the ultrasonic signal and for calculating the distance of the vehicle from an obstacle may be an integral part of the driver assistance system. The term sensor includes the sensor system having a transceiver and the piezoceramic oscillator in the ultrasonic sensor, which may be operated both as a transmitter corresponding to a loudspeaker and as a receiver corresponding to a microphone. Furthermore, the electronic system for control and signal processing is situated on a small printed circuit board within the sensor. The term sensor means each ultrasonic sensor with the aid of which the distance of the vehicle from an obstacle is ascertained, i.e., the terms sensor and ultrasonic sensor are used synonymously in the context of the present invention.

According to one aspect of the present invention, the power requirement of the sensor is reduced via a reduction of the sound pressure during a transmission pulse of the ultrasonic sensor. By reducing the ultrasonic sound pressure after a detection of an undervoltage in the onboard electrical system of the vehicle, the current consumption of the sensor decreases; therefore, its power consumption also decreases. As a result, the voltage drop at the sensor is significantly lower. The sensor also operates at lower supply voltages, which, however, is associated with a lower sound pressure.

The decreased sound pressure possibly results in a reduced range and maximum measuring range of the ultrasonic sensor for ascertaining the distance of the vehicle from an obstacle. However, the basic function of the driver assistance system is maintained, albeit with a lower range. All functions which are based on the data of the ultrasonic sensor thus still receive distance information even in the event of an undervoltage in the onboard electrical system of the vehicle and are generally able to continue operating. This means better availability of the driver assistance system even in the event of suddenly occurring undervoltages in the onboard electrical system of the vehicle.

According to another aspect of the present invention, the power requirement of the sensor is reduced via a shortening of the duration of the transmission pulse of the ultrasonic sensor. This measure may be carried out alternatively or cumulatively to a reduction of the sound pressure. After a detection of an undervoltage in the onboard electrical system of the vehicle, a reduction of the duration of the ultrasonic transmission pulse which is generated with the aid of the sensor is carried out. Subsequent to the reduction of the duration, the energy consumption of the sensor for generating a transmission pulse decreases, thus significantly reducing the power required for the ultrasonic transmission pulse generation. As a result, the voltage drop at the sensor decreases, since the required power is reduced. Thus, the sensor operates even at lower supply voltages, having a reduced ultrasonic pulse duration. All functions of the driver assistance system which are based on the ultrasound data thus still receive distance information even in the event of an undervoltage in the onboard electrical system of the motor vehicle. This makes it possible to maintain the function of the driver assistance system even in the event of an undervoltage in the onboard electrical system of the vehicle.

The measures of reducing the sound pressure and shortening the ultrasonic pulse duration may be applied alternatively or cumulatively. This possibly results in a reduction of the maximum measuring range of the ultrasonic sensor for ascertaining the distance of the vehicle from an obstacle. However, it is possible to maintain at least the basic function with the lower maximum measuring range, thus making it possible to maintain the overall function of the driver assistance system.

According to another aspect of the present invention, a backup capacitor or multiple backup capacitors are situated for stabilizing the supply voltage of the sensor. One or multiple backup capacitors may be integrated into the sensor. Thus, one or multiple capacitors are connected in parallel to the supply voltage which is used as a voltage and energy source for supplying the ultrasonic sensor. The backup capacitor or the backup capacitors is/are used as a voltage or energy source at instants of high power requirement, i.e., at the instant in which a measurement request is made to the ultrasonic sensor and an ultrasonic transmission pulse is to be generated by the ultrasonic sensor.

In addition to the onboard electrical system of the vehicle, the energy for the transmission pulse may thus also be provided via backup capacitors in the sensor itself. The backup capacitors are preferably charged during the reception phases of the sensor.

By situating one or multiple backup capacitors, it is thus possible to further increase the availability of the driver assistance system even in the event of undervoltages in the onboard electrical system of the vehicle. By situating such backup capacitors, the voltage drop in the sensor to be borne by the onboard electrical system decreases, since the required power may be obtained in a higher proportion from the backup capacitors, so that the sensor may continue to be operated even at considerably reduced supply voltages in the onboard electrical system of the vehicle.

In the supply line of the onboard electrical system via which the sensor is supplied with electrical energy, a diode may be situated upstream from the branch to one or multiple backup capacitors which are connected in parallel to the supply line, in order to prevent feedback of the backup capacitors into the onboard electrical system.

In the method for operating a driver assistance system of a vehicle including at least one ultrasonic sensor for ascertaining the distance of the vehicle from an obstacle, the sensor being supplied with electrical energy by an onboard electrical system of the vehicle, it is provided according to the present invention that the voltage of the onboard electrical system is monitored with the aid of an undervoltage detector, and in the event of detection of an undervoltage in the onboard electrical system, the power requirement of the ultrasonic sensor is reduced.

Since the available voltage in the onboard electrical system of the vehicle is continuously monitored in any case by the vehicle electronic system, the refinement of the method according to the present invention for operating the driver assistance system of the vehicle may be implemented very simply, since the information about the voltage present in the onboard electrical system of the vehicle is continuously available.

The reduction of the power requirement of the ultrasonic sensor may be carried out via a reduction of the sound pressure during a transmission pulse of the ultrasonic sensor. Alternatively or cumulatively, the reduction of the power requirement may be carried out via a shortening of the duration of the transmission pulse of the ultrasonic sensor.

According to another aspect, in a method for operating a driver assistance system of a vehicle for ascertaining the distance of the vehicle from an obstacle with the aid of at least one ultrasonic sensor, a stabilization of the supply voltage of the sensor may be carried out with the aid of one or multiple backup capacitors which are connected in parallel to the supply voltage of the onboard electrical system. By drawing on one or multiple backup capacitors, the voltage drop at the sensor which reacts to the onboard electrical system may be further reduced, thus further reducing the load of the onboard electrical system and significantly increasing the availability of the system. The charging of the backup capacitor or the backup capacitors is preferably carried out during the reception phases of the sensor. It is thus ensured that a sufficient voltage and energy are available for covering the power requirement for generating the next transmission pulse for generating the next transmission pulse again.

DETAILED DESCRIPTION OF THE INVENTION

Figure 1:
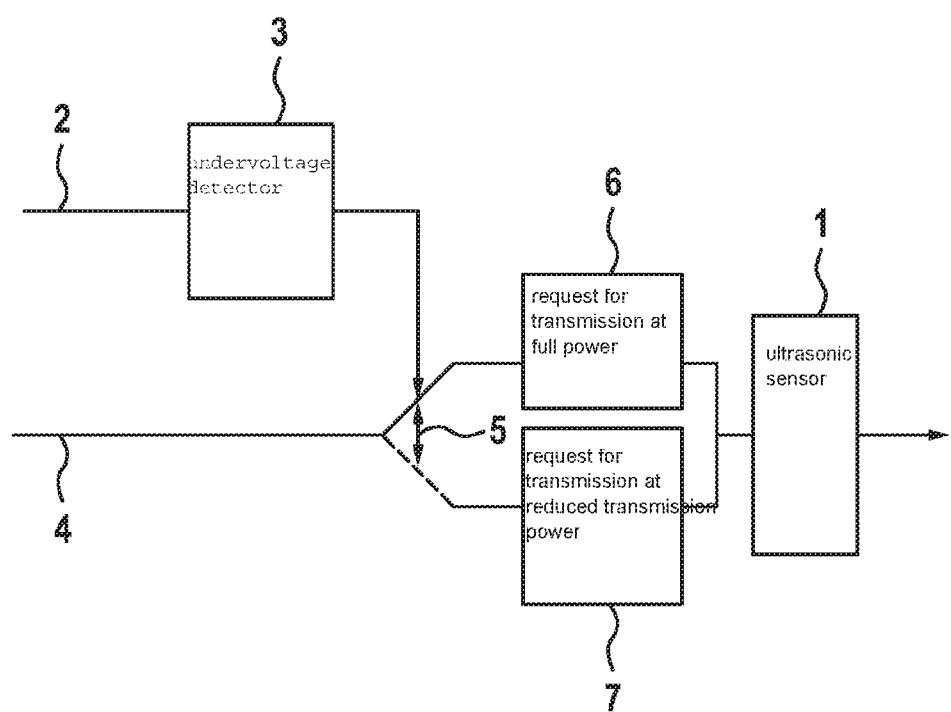
FIG. 1 shows a schematic representation of a first exemplary embodiment of the present invention.
Figure 2:
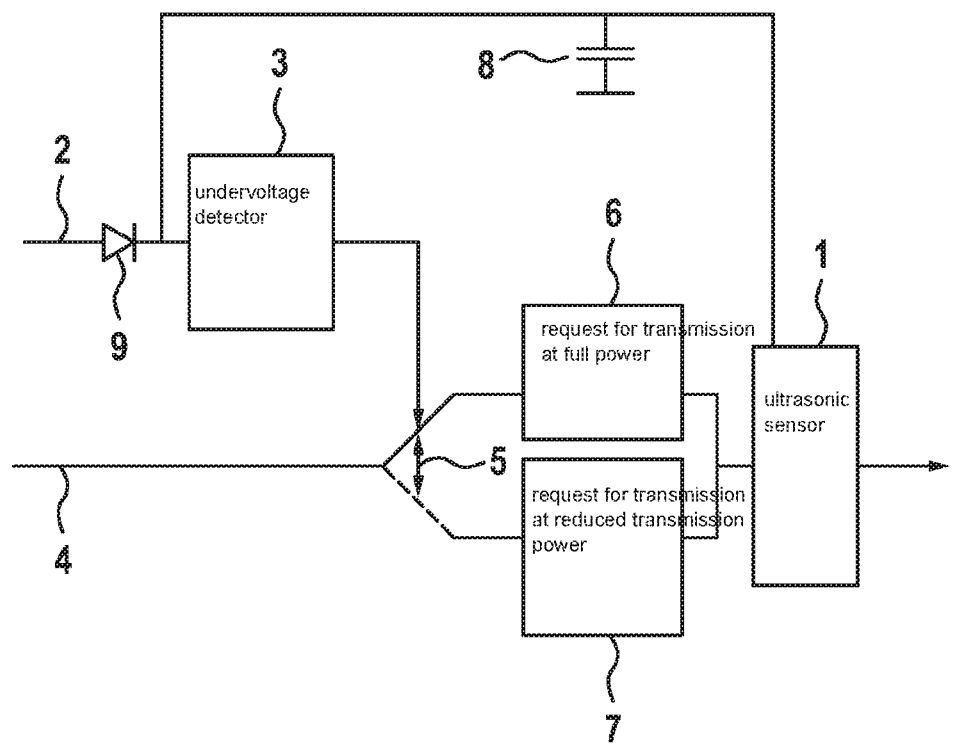
FIG. 2 shows a schematic representation of a second exemplary embodiment of the present invention.

In FIGS. 1 and 2, identical components are provided with identical reference numerals.

FIG. 1 depicts a first exemplary embodiment of a driver assistance system of a vehicle including an ultrasonic sensor for ascertaining the distance of the vehicle from an obstacle. The electrical connection of sensor 1 is established to the onboard electrical system of the vehicle via line 2, which is used for supplying voltage, and to the control unit, which is not depicted, via bidirectional signal line 4. The transmission function of sensor 1 is triggered and the evaluated reception signal from sensor 1 is returned to the control unit via bidirectional signal line 4. If sensor 1 receives a digital transmission pulse from the control unit via signal line 4, the electronic circuit causes the aluminum diaphragm in sensor 1 to vibrate using voltage pulses at the resonance frequency, and ultrasonic waves having a frequency of approximately 48 kHz are transmitted, i.e., an ultrasonic pulse of sensor 1 is generated.

Meanwhile, the sound reflected by the obstacle in turn causes the quiescent diaphragm to vibrate, which then functions as a microphone. These vibrations are converted by a piezoceramic in sensor 1 into an analog electrical signal and amplified by the integrated sensor electronic circuit in sensor 1 and transformed into a digital signal. The distance measurement with the aid of sensor 1 is carried out via the echo-sounding method via an evaluation of the propagation time of the ultrasonic pulse to an obstacle and of the echo pulses reflected by obstacles back to sensor 1.

An undervoltage detector 3 is integrated into supply line 2 of the onboard electrical system, with the aid of which the applied supply voltage at supply line 2 of the onboard electrical system is monitored. If the occurrence of an undervoltage, i.e., the occurrence of an undershooting of a minimum limiting value in supply line 2 is detected with the aid of undervoltage detector 3, a case distinction 5 is carried out in the event of a signal request via signal line 4.

If a sufficient supply voltage is present, case distinction 5 causes a request for transmission 6 at full transmission power to be transmitted to sensor 1. However, if undervoltage detector 3 detects an undervoltage in supply line 2, case distinction 5 causes a request for transmission at reduced transmission power 7 to be transmitted to the sensor. The reduction of the transmission power at ultrasonic sensor 1 may be carried out via a reduction of the sound pressure and/or via a shortening of the duration of the transmission pulse of ultrasonic sensor 1.

FIG. 2 depicts a second exemplary embodiment of the present invention, identical components being provided with identical reference numerals. An undervoltage detector 3 is once again provided in supply line 2 of the onboard electrical system for supplying sensor 1 with electrical energy. If a measurement process is triggered via signal line 4, a case distinction 5 is again carried out to determine whether or not an undervoltage has been detected in supply line 2 of the onboard electrical system with the aid of undervoltage detector 3. Correspondingly, either a request for transmission at full transmission power 6 or a request for transmission at reduced transmission power 7 is made to sensor 1.

Furthermore, a backup capacitor 8 is connected in parallel to supply line 2, which is used as an energy source for covering the high power requirement when ultrasonic sensor 1 generates a transmission pulse. Backup capacitor 8 is charged during the reception phases of sensor 1 via supply line 2 of the onboard electrical system and is used for stabilizing the supply voltage of sensor 1. In order to prevent feedback by backup capacitor 8 to the onboard electrical system via supply line 2, a diode 9 is provided in supply line 2.

Using case distinction 5 to determine whether an undervoltage has been detected with the aid of undervoltage detector 3 and a possible reduction of the power requirement of sensor 1 due to a transmission request having reduced transmission power 7, the availability of the driver assistance system is ensured even in the event of suddenly occurring undervoltages in onboard electrical system 2 of the vehicle.

Figure 3:
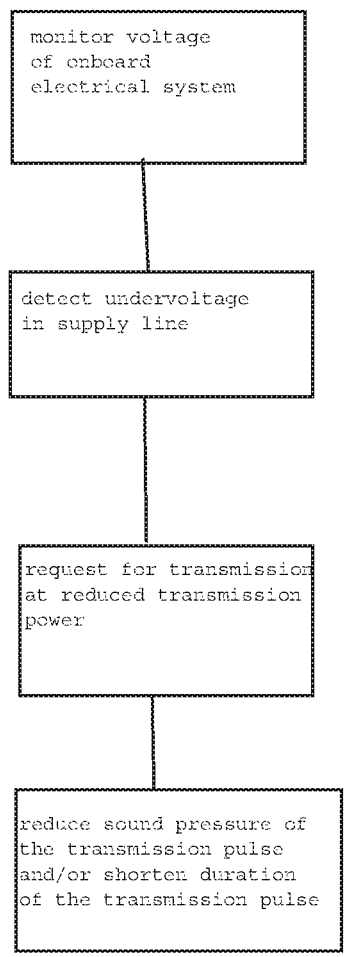
FIG. 3 shows a flow chart of a method for operating a driver assistance system when an overvoltage is detected.

FIG. 3 shows a flow chart of the method for operating the driver assistance system when an overvoltage is detected. As shown, the voltage of the onboard electrical system is monitored. An undervoltage in the supply line is detected. A request is made for transmission of the transmission pulse at reduced power. Finally, the sound pressure of the transmission pulse is reduced and/or the duration of the transmission pulse is shortened.

What is claimed is:

1. A driver assistance system of a vehicle, comprising:
at least one ultrasonic sensor for ascertaining a distance of the vehicle from an obstacle, the ultrasonic sensor being supplied with electrical energy by an onboard electrical system of the vehicle; and
an undervoltage detector configured to detect an undervoltage in the onboard electrical system, wherein the power requirement of the ultrasonic sensor is reduced in the event of an undervoltage in the onboard electrical system, the power requirement being reduced by the ultrasonic sensor by reducing transmission power during a transmission pulse transmitted by the ultrasonic sensor;
wherein the reduction of the transmission power is achieved by at least a shortening of a duration of the transmission pulse transmitted by the ultrasonic sensor.

2. The driver assistance system as recited in claim 1, further comprising:
at least one backup capacitor for stabilizing the supply voltage of the ultrasonic sensor.

3. The driver assistance system as recited in claim 2, wherein a diode is situated upstream from the backup capacitor in a supply line of the onboard electrical system via which the ultrasonic sensor is supplied with electrical energy.

4. A method for operating a driver assistance system of a vehicle including at least one ultrasonic sensor for ascertaining a distance of the vehicle from an obstacle, the ultrasonic sensor being supplied with electrical energy by an onboard electrical system of the vehicle, the method comprising:
monitoring, by an undervoltage detector, a voltage of the onboard electrical system;
detecting, by the undervoltage detector, an undervoltage in the onboard electrical system; and
based on the detecting, reducing the power requirement of the ultrasonic sensor by causing the ultrasonic sensor to reduce transmission power during a transmission pulse transmitted by the ultrasonic sensor;
wherein the reduction of the transmission power is achieved by a shortening of a duration of the transmission pulse transmitted by the ultrasonic sensor.

5. The method as recited in claim 4, further comprising:
stabilizing the supply voltage of the ultrasonic sensor with the aid of at least one backup capacitor.

6. A method for operating a driver assistance system of a vehicle including at least one ultrasonic sensor for ascertaining a distance of the vehicle from an obstacle, the ultrasonic sensor being supplied with electrical energy by an onboard electrical system of the vehicle, the method comprising:
- monitoring, by an undervoltage detector, a voltage of the onboard electrical system;
- detecting, by the undervoltage detector, an undervoltage in the onboard electrical system; and
- reducing the power requirement of the ultrasonic sensor based on the detecting; and
- stabilizing the supply voltage of the ultrasonic sensor with the aid of at least one backup capacitor;
- wherein the backup capacitor is charged during reception phases of the ultrasonic sensor.

* * * * *